UNITED STATES PATENT OFFICE.

ELWYN WALLER, OF NEW YORK, N. Y.

METHOD OF MAKING WHITE LEAD.

SPECIFICATION forming part of Letters Patent No. 509,057, dated November 21, 1893.

Application filed March 20, 1893. Serial No. 466,917. (No specimens.)

*To all whom it may concern:*

Be it known that I, ELWYN WALLER, a citizen of the United States, residing in the city, county, and State of New York, have invented certain new and useful Improvements in Methods of Making White Lead, of which the following is a specification.

My invention relates to the manufacture of white lead, for use as a pigment, from the native carbonates or ores containing native lead carbonates.

In carrying out my invention I heat an aqueous solution of ammonium acetate in a suitable vessel, still, or digester, in contact with native lead carbonate or ores containing the same, preferably pulverized. The aqueous vapors evolved by such boiling treatment are collected and condensed, and one obtains in this distillate, a solution of ammonium carbonate. In the vessel in which the solution has been heated will now be found a solution of lead acetate, either neutral or basic, according to the proportion of ammonium acetate used, and mingled with this solution will be found the undissolved portions of the ore. The solution of lead acetate is separated from the solid matter by filtering, or other means known in the arts, and the clear solution thus obtained is then mixed with the distillate, namely, the solution of ammonium carbonate. The effect of this mixing is to precipitate lead from the solution in the form of lead hydrocarbonate or white lead, the supernatant liquid in the precipitating tank or vessel being a solution of ammonium acetate. Thus the ammonium acetate previously employed is regenerated in a form suitable for the treatment of another portion of the lead carbonate ores, and the operation above described may be carried on indefinitely with very slight loss of the ammonium acetate employed.

The temperature at which the solutions are mixed is not altogether a matter of indifference. In general terms the higher the temperature of the solutions mixed, the finer the quality of the product. The best temperature at which to work will be regulated by the quality and quantity of product desired, the bulk of the solutions employed, the amount of surface exposed for evaporation in the mixing vessel, and other similar conditions. If, as is sometimes the case, copper or silver exists in the ore treated in such a condition that portions of these metals, or either of them, also pass into the lead acetate solution in the preparation of the same as above described, the addition of a small percentage of metallic lead, so comminuted as to present an extended surface, may be added. This addition of metallic lead has the effect to precipitate from the solution the copper or silver it may contain, in a metallic form, a corresponding amount of the lead passing into the solution in accordance with well known chemical laws. Of course, the surplus of metallic lead so introduced, if any, together with the copper or silver which may be removed in a metallic form by this means, will mingle with the undissolved residue of solid matters and be separated from the clear solution of lead before proceeding to precipitation.

The proportions of the crude materials used in the process will depend upon the richness of the ore and the perfection of the arrangements for condensing the distillate. In theory, the reaction from the mixture of one hundred and fifty-four pounds of ammonium acetate with two hundred and seven pounds of lead as carbonate, or two hundred and sixty-seven pounds of lead carbonate, will afford three hundred and twenty-five pounds of neutral lead acetate and ninety-six pounds of ammonium carbonate. If it be the object to maintain a basic lead acetate solution, the proportion of ore must be increased, thereby increasing the proportion of lead presented for solution. Twice the above stated proportion of lead, as carbonate will afford, theoretically, the necessary proportion for the formation of a bi-basic lead acetate, the other proportions remaining the same. Three times that proportion of lead, as carbonate (six hundred and twenty-one pounds), will form a tri-basic acetate. Some allowance must be made, however, for loss from imperfect condensation, which is inevitable when the process is carried out on a commercial scale. Also, where the ores treated contain but small amounts of lead carbonate, the proportion of water used for the solution may need to be increased, comparatively, in order to give the required mobility to the mixture of ore and solution. With rich ores, containing from sixty to seventy per centum of lead it has been found practicable to use a solution of ammonium acetate containing about one pound of the salt to a gallon of water. Of such solution it is advisable to use about forty gallons to every hundred pounds of lead existing in the ore as carbonate, the treatment being conducted in a closed vessel capable of being heated to the temperature of ebullition and connected with a condenser in any manner found most convenient. The distillation is best conducted with a moderate heat so as to keep the liquid gently boiling. When about one-half to two-thirds of the liquid has been distilled off, the distilling vessel contains the lead in solution. The distillation may then be stopped and this solution of lead be separated from the undissolved residue by any suitable means.

The precipitated lead hydrocarbonate, or white lead may be washed and dried for use by well known methods.

The washings from the undissolved residue, or solid matter, may be employed to bring the bulk of the solutions used, up to the necessary volume; or, after neutralizing with acetic acid, they may be evaporated to a point at which neutral lead acetate will crystallize out, and the product be thus prepared for market as lead acetate. The washings from the white lead may be economized in a similar manner, or be utilized in the works in other ways. Any possible loss of strength of the ammonium acetate solution may be made good by the addition of more of this salt.

The apparatus employed in carrying out my process forms no part of my present invention. Indeed it is not material what form of apparatus is employed, so long as it is adapted to the end sought.

I am aware that it is not new in the manufacture of white lead to utilize the reaction of ammonium acetate on litharge or massicot, but processes dependent on this reaction are entirely different from mine and necessitate the employment of free carbon dioxide. None of these processes employs distillation and they are usually carried out without the aid of heat.

Having thus described my invention, I claim—

1. The herein described step in the process of making white lead, which consists in heating native lead carbonate with an aqueous solution of ammonium acetate, whereby lead acetate and ammonium carbonate are formed, the latter being carried over with the aqueous vapor and condensed, substantially as set forth.

2. The herein described method of making white lead, which consists in first, distilling natural lead carbonate with an aqueous solution of ammonium acetate and condensing the distillate which is a solution of ammonium carbonate, then separating the resultant clear solution of lead acetate from the undissolved residue from the distilling vessel, and then mixing together the said solutions of ammonium carbonate and lead acetate, whereby lead hydrocarbonate is precipitated and a solution of ammonium acetate remains.

In witness whereof I have hereunto signed my name in the presence of two subscribing witnesses.

ELWYN WALLER.

Witnesses:
 HENRY CONNETT,
 JAS. KING DUFFY.